United States Patent
Filippi et al.

(10) Patent No.: US 6,571,313 B1
(45) Date of Patent: May 27, 2003

(54) MEMORY FOR INFORMATION SEARCH THROUGH PREFIX ANALYSIS, IN PARTICULAR FOR BUILDING ROUTING TABLES FOR NODES OF HIGH SPEED COMMUNICATION NETWORKS, SUCH AS THE INTERNET NETWORK

(75) Inventors: Enrica Filippi, Turin (IT); Viviana Innocenti, Rivalta (IT)

(73) Assignee: Telecom Italia Lab S.P.A., Turin (IT)

(\*) Notice: Subject to any disclaimer, the term of this patent is extended or adjusted under 35 U.S.C. 154(b) by 0 days.

(21) Appl. No.: 09/421,505

(22) Filed: Oct. 20, 1999

(30) Foreign Application Priority Data

Oct. 27, 1998 (IT) ........................................ TO98A0909

(51) Int. Cl.[7] ................................................ G06F 12/06

(52) U.S. Cl. ........................ 711/108; 711/212; 711/218; 707/6; 370/391

(58) Field of Search ................................. 711/103, 108, 711/206, 218, 212, 217, 219, 109; 707/6; 370/389, 255, 392, 391

(56) References Cited

U.S. PATENT DOCUMENTS

| | | | | | |
|---|---|---|---|---|---|
| 6,052,683 | A | \* | 4/2000 | Irwin ............................. | 707/6 |
| 6,237,061 | B1 | \* | 5/2001 | Srinivasan et al. ........... | 711/108 |
| 6,396,842 | B1 | \* | 5/2002 | Rochberger ................... | 370/255 |
| 6,421,342 | B1 | \* | 7/2002 | Schwartz et al. ............. | 370/392 |
| 6,430,527 | B1 | \* | 8/2002 | Waters et al. ................. | 370/389 |

OTHER PUBLICATIONS

Doeringer et al., "Routing On Longest-Matching Prefixes", IEEE/ACM Transactions on Networking, vol. 4, No. 1, pp. 86–97, Feb. 1996.\*

Zitterbart et al, "Efficient routing Table Lookup for IPv6", High–perfomance Communication Systems, The fourth IEEE Workshop, pp. 1–9, Jun. 1997.\*

Lampson et al. "IP lookup using multiway and multicolumn search", INFOCOM'98. Seventeenth Annual Joint Conference of the IEEE Computer and Communications Societies, pp. 1248–1256, Apr. 1998.\*

"Small Forwarding Tables for Fast Routing Lookups" Mikael Degermark et al, Dep. of Computer Science and Electrical Engineering, Lulea Univ. of Technology—Sweden, 12 pages.

"Putting routing tables in Silicon", Tong–Bi Pei and Charles Zukowski, IEEE Network Magazine—Jan. 1992, 9 pages.

(List continued on next page.)

*Primary Examiner*—Matthew Kim
*Assistant Examiner*—Pierre-Michel Bataille
(74) *Attorney, Agent, or Firm*—Herbert Dubno

(57) ABSTRACT

A memory for searching information through prefix analysis, in particular for building routing tables for nodes of high speed communication networks, such as Internet network, has a memory element which stores a set of information items each associated with a mask information indicative of the number of significant characters in the respective prefix and with a target information. For the implementation of a search criterion based on the longest prefix match, each cell comprises an information field that provides either an address of a next row for the continuation of a search or an information relating to a target reached, and a pair of flags (GO, TARGET) specifying the contents of the information field. An auxiliary vector (AUX), which has as many cells as there are memory rows is arranged to store, when the flags in a cell in the memory element indicate the reaching of a target together with the need of prosecuting search operations in a next row, the target information in its cell associated to said next row.

9 Claims, 12 Drawing Sheets

OTHER PUBLICATIONS

"Patricia—Practical Algorithn to Retrieve Informatio n Coded in Alphanumeric", Donald R.Morrison, Sandia Laboratory, Alberquerque, New Mexico, Journal of Computing Machinery, vol. 15,No. 4,Oct. 1968, pp. 514–534.

"Das Internet–Protocoll Der Nachsten Generation",Hans Peter Gisiger, Bern, IP Version 6, comtec May 1998, 7 pages.

"IP Next Generation Overview", Robert M.Hinden, May 14, 1995, 18 pages.

"Faster IP Lookups Using Controlled Prefix Expandion", V.Srinivasan, George Varghese, Supported by NSF Grant NCR–9405444 . . . , Nov. 5, 1997, 22 pages.

* cited by examiner

| GO | TARGET | DATA |

| 1 | TARGET | NEXTROW |

| 10 | 1 | MASK | VALUE | TBAK |

| row | cell 00 | | | 01 | | | 10 | | | 11 | | | AUX | | |
|---|---|---|---|---|---|---|---|---|---|---|---|---|---|---|---|
| | G | T | DATA | | | | | | | | | | | | |
| 0 | 1 | 0 | 1 | 1 | 0 | 4 | 0 | 1 | (5,D,D) | 0 | 1 | (5,D,-) | | | |
| 1 | | | | | | | 1 | 1 | 2 | | | | | | |
| 2 | | | | 1 | 0 | 3 | | | | | | | 0 | 1 | (4,A,-) |
| 3 | | | | | | | | | | 0 | 1 | (8,B,-) | | | |
| 4 | | | | | | | 1 | 0 | 5 | | | | | | |
| 5 | | | | | | | 0 | 1 | (5,C,C) | 0 | 1 | (5,D,D) | | | |
| 6 | | | | | | | | | | | | | | | |
| 7 | | | | | | | | | | | | | | | |

MEMORY FOR INFORMATION SEARCH THROUGH PREFIX ANALYSIS, IN PARTICULAR FOR BUILDING ROUTING TABLES FOR NODES OF HIGH SPEED COMMUNICATION NETWORKS, SUCH AS THE INTERNET NETWORK

FIELD OF THE INVENTION

The present invention relates to a memory for information search through a prefix analysis, devoted in particular to building routing tables for high speed communication networks, preferably for the Internet network.

BACKGROUND OF THE INVENTION

Communication protocols for modern high speed networks, such as the ATM networks, the Internet network etc., are based on the transmission of information packets containing, in the header, information relating to the destination address of the packet. In a node of the network, when receiving a packet, the routing control units use the address to perform a search inside a suitable table or data base and to locate the output interface to which the packet must be supplied for further forwarding to a successive network unit. Presently, transmission rates of the order of the Gbits/s are common and therefore routing time in a node must be very short to prevent impairing regular traffic flow. To provide a quantitative indication, it must be considered that a 1 Gbit/s transmission with packets of about 1000 bits requires for the nodes to handle about 1 million packets per second. Taking into account the switching time, the time necessary for possible packet header processing and possible guard times between consecutive packets, the search in the routing table, which is the longest operation, must be performed in a time somewhat less than 1 $\mu$s. The situation becomes more critical with increasing communication speed.

Referring for simplicity of description and just as an example to the Internet network, there is an exponential growth of both the number of host computers connected to the network and the traffic, as well as of the band requirements, also due to the continuous development of new applications using the Internet network. All this results in an increase in the routing table size, which causes in turn a longer search operation. Now it is well known to the technicians that, while it is easier and easier to have high memory capacity at low cost, reduction of access time to large memories involves considerable technological problems.

In order to have an easier adaptation to the network expansion, the Internet addresses can be organized according to a hierarchical structure, in the sense that groups of addresses corresponding e.g. to the same geographical region or to the same provider share the most significant address bits (prefix). These prefixes have variable lengths and can in turn constitute the most significant part of other prefixes (prefixes of prefixes). Further details on the structure of the Internet addresses can be found for example in the documents "Das Internet-Protokoll der nachsten Generation" by H. P. Giesiger, Comtec 5, 1998, pages 20 to 26, or "IP Next Generation Overview", by R. M. Hinden, dated May 14, 1995 and available at the Internet site http:playground.sun. com/pub/ipng/html/INET-Ipng-Paper.html.

In order to reduce the search complexity, the routing information in the network is related above all to the address of a subsequent node in the path leading to the destination of the packet being processed. That address is commonly indicated with the term "next hop". Since the possible different next hops in a routing table may be of the order of a hundred, it is possible to extract the relevant information and store it into another data structure. Given the small dimensions, this structure can be accessed by using direct access through an index, designated in literature "TARGET", which is identified starting from the address of the received packet. In practice, in a routing management unit, by using as a search key the packet destination address, access is gained to a forwarding table which is a subset of the complete routing table of a network and where each row contains a prefix (addressmask.pair, where the mask indicates the number of significant bits of the address, i.e. the bits constituting the prefix) and a corresponding data (the target, commonly a pointer to the output interface, together with further information). A prefix originates a match for the search key (i.e. it allows reaching a target) if the bit-by-bit AND of the key with the mask associated to the address is equal to the address itself.

The variability of the prefix lengths causes a further complication since the index search may result in retrieving several targets, since the comparison may give a positive result for several prefixes of different lengths. In these conditions the actual target is that corresponding to the longest prefix, i.e. the most specific one for the destination. This criterion is known as the "longest prefix match".

Theoretically, the most efficient and fastest method to perform a search based on the longest prefix match is storing the information items (entries) into one or more ternary CAMs (CAM=Content Addressable Memory). In a ternary CAM, each memory bit may assume three values: 0, 1 and ("don't care"). The comparison between the bits of the comparison register and the memory bits set at a "don't care" logic value obviously is always positive. It is therefore possible to implicitly implement the masks associated to a data by simply setting at don't care level the relevant bits of the data itself. The drawback of this type of device mainly lies in the high price and poor integration capability.

In order for low cost conventional memories to be used, it is therefore necessary to utilize algorithms for searching in data bases which are both fast and compact. The speed of a search algorithm is strictly connected to the number of memory accesses, while the compactness is determined by the quantity of memory needed for storing the data structure being used. The final aim is that of minimizing as much as possible both the access number and the memory size required to store the information for the search process.

The practical implementations of the routing algorithms suitable for satisfying the criterion of the longest prefix match may be both of the software type and of the hardware type. In general, they must meet anyhow a certain number of common requirements such as:

search speed as independent as possible from the table dimensions;

small variance of algorithm performance between the worst case and the best case;

easy incremental (or localized) table updating (i.e. the insertion or cancellation of some information items should not require re-writing the entire table or substantial portions of the same);

flexibility, so as to-be easily adaptable to future technological developments and to variations in the address organization;

memory organization as regular as possible for preventing waste.

Several solutions have already been proposed for solving the problem of the Internet network routing in such a manner as to take into account the need of implementing the longest prefix match.

A first group of solutions is based on an algorithm known as "PATRICIA", which is an algorithm for the storage, indexing and retrieval of information in large files, particularly catalogues of libraries. The principles of this algorithm are described in the article "PATRICIA—Practical Algorithm To Retrieve Information Coded In Alphanumeric", by D. R. Morrison, Journal of the Association for Computing Machinery, Vol. 15., No. 4, October 1968, pages 155 and following, and its application in solving routing problems in the Internet network is widely documented in the relevant technical literature. The PATRICIA algorithm is substantially an algorithm operating on a prefix tree, built on the address bits, where each bit corresponds to a node. The address bits are examined one at a time. To avoid examining nodes which correspond to nonexisting branches, each bit is associated to an indication of the successive bit to be examined. Once the search is over, a check is performed on the real existence of the prefix. Since each node corresponds to one or more memory access, and considering that the memory access is much slower than the data processing, the algorithm provides a real reduction of the total time for retrieving the address.

The essential disadvantage of the solutions based on the PATRICIA algorithm is that a practical implementation is to be calibrated on the worst case (in practice, the passage through all the tree nodes must be accounted for), while in the present Internet network it has been noticed that statistically about twenty nodes must be analyzed before reaching the target (the address searched for). Therefore, these solutions are intrinsically quite slow and present, in addition, a strong variance between the worst case and the typical case.

To accelerate the search process, some algorithms have been proposed where multiple address bits are taken into consideration at each search step along the tree instead of one bit only. The article "Putting Routing Tables in Silicon", by T. Pei and C. Zukowski, IEEE Network Magazine, January 1992, page 42 and following, discloses how these algorithms can be implemented in hardware by means of the so called "trie memories". The main problem in this case is that the conventional trie memories can be utilized only if no multiple matches are present.

Therefore, many, proposals of algorithms intended for performing searches in routing tables for the Internet network in such a manner as to reduce the memory needed for the table or generally to fasten the search process, are based on restructuring the prefixes so as to eliminate the multiple matches. In this way the algorithms could be theoretically implemented with the use of trie memories.

Examples of restructuring of prefixes are described by M. Degemark et al in the paper "Small Forwarding Tables for Fast Routing Lookups" presented at the conference ACM SIGCOMM '97, Cannes (France), Sep. 16–18, 1997, and by V. Srinivasan and G. Varghese in the paper "Faster IP Lookups using Controlled Prefix Expansion" presented at the conference ACM SIGMETRICS '98, Madison (Wisconsin, USA), Jun. 22–26, 1998.

The solution proposed by Degemark et al leads to a three level tree where each level covers 16, 8 and 8 bits of the address, respectively, and is stored in a particularly compact structure, made possible by a suitable restructuring of prefixes, thanks to which each prefix in the tree locates an interval of addresses. This solution drastically minimizes the quantity of memory required and the access times to the memory itself for the search with respect to the solution based on PATRICIA (about 400 ns for the worst case that foresees 12 accesses); yet restructuring the prefixes makes the incremental updating impossible and requires the complete re-writing of the memory at each updating: the updating process then is very slow and may cause problems to the normal network management.

The solution proposed by V. Srinivasan and G. Varghese restructures the prefixes so that they only take a limited number of length values (possibly variable), and expands the shortest prefixes by substituting them with the set of prefixes having the closest predetermined length value. The routing table is transformed into a certain number of sub-tables each storing pointers to the successive sub-table, and the lengths of such sub-tables are optimized so as to obtain a reduction, for a given access number, of the memory needed for that specific set of prefixes. By this arrangement a reduction of the quantity of memory used is in general obtained, even though the table length generally is not predictable and then an optimum exploitation of the physical memory is not obtained. In addition, the resulting data structure is optimized for a specific set of prefixes and therefore it is scarcely general.

OBJECT OF THE INVENTION

The present invention has as its object to provide a structure which guarantees an optimum exploitation of the physical memory and an incremental updating of the routing table (or in general of the set of entries).

SUMMARY OF THE INVENTION

The memory according to the invention comprises:

a memory element comprising a plurality of rows and columns of memory cells where each cell stores an item belonging to a set of information items, each information item being associated to a mask indicating a number of significant characters of a respective prefix and to a target constituting a data possibly utilizable for accessing a further set of information items, and control devices for controlling the search for a specific information item in the memory and for updating the memory, said control devices operating through the comparison between successive portions, of predetermined lengths, of a string of characters received at the input and corresponding portions of stored prefixes, said prefixes possibly having a variable length which is not a multiple of the length of said portions.

According to the invention for implementing a search criterion based on the longest prefix match:

each cell is subdivided into an information field, which stores dither a successive row address for continuing a search, or an information relating to a reached target, and a pair of flags which specify the contents of the information field, and an auxiliary vector is provided, that presents as many cells as are the rows in said memory element and that, when the flags of one of said cells of the memory element indicate the reaching of a target together with the need of prosecuting the search into a successive row, is capable of storing the target information into the cell associated to said successive row, each cell of said auxiliary vector storing an information field and a pair of flags which have the same tasks as those of the cells of said memory element.

The invention concerns also a method for the management of the above mentioned memory.

BRIEF DESCRIPTION OF THE DRAWING

For a detailed explanation reference is made to the enclosed drawing, where.

SPECIFIC DESCRIPTION

Figure 1:
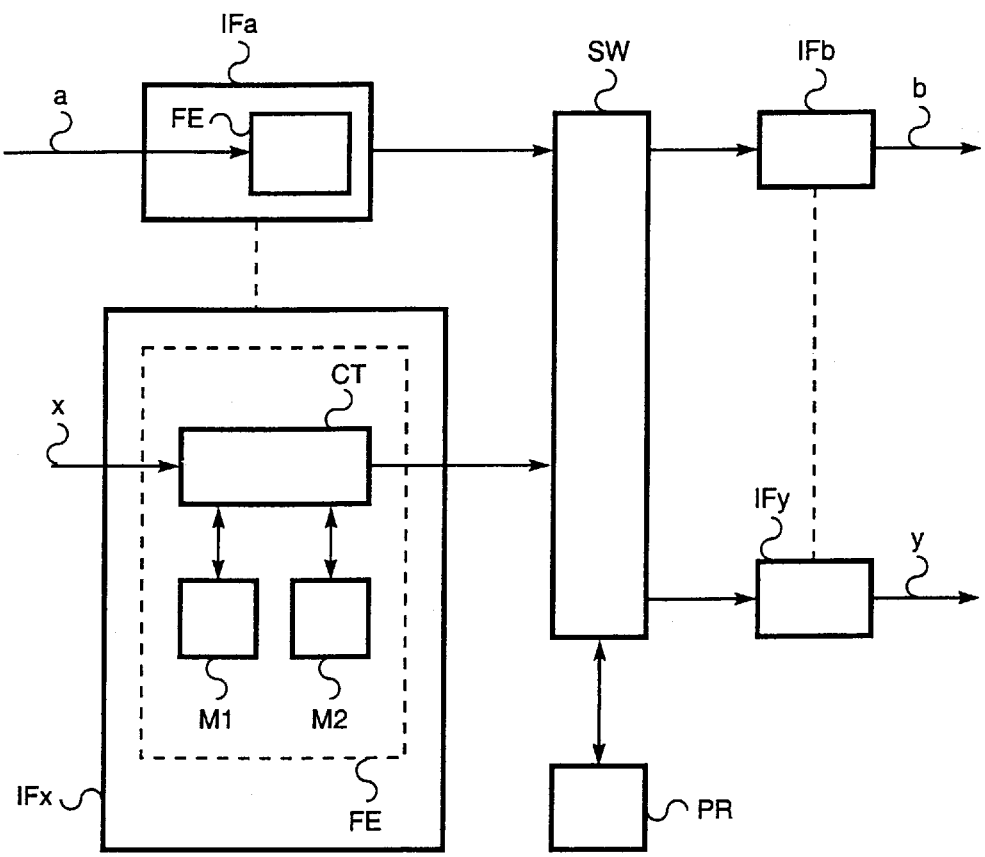
FIG. 1 is a basic diagram of a routing node into the Internet network.

With reference to FIG. 1, a router in a node of a network such as an Internet network may be schematized by a set of input interfaces lFa ... lFx and output interfaces lFb ... lFy, each one connected on one side to lines generally indicated with a, x, b, y, and on the other side to a switching unit SW, associated with a control device or network processor PR. In general, the input interfaces comprise buffers for the incoming data (not shown in Figure) and information processing devices designed to manage the routing search in the node, i.e. to locate the output interface to which a packet incoming at an input interface must be forwarded. The processor PR will accomplish all the other processing required for the management of the communications and control of the node. In different router arrangement, the routing search could be assigned to specific processing units. The routing search units are indicated on the whole with FE.

In order to perform this search, the units FE should contain a local replica of the portion of the routing table relating to the prefixes of the destinations which can be reached from the node itself. As mentioned in the introduction, the routing tables may be structured on two levels (and therefore make use of two storage devices). In the first level, starting from the packet address, an index or a "target" is located corresponding to the longest prefix comprised in the table for that destination address, while in the second level, by means of such index, access is gained directly to the required information for forwarding the packet. The two devices are represented for the interface lFx and are indicated respectively with M1, M2. Reference CT indicates the processing and control devices which allow searching in the table and table updating as well.

The invention concerns an implementation of memory M1 under the form of a so called multibit trie memory, extended for implementing a search based on the longest prefix match.

Figure 2:
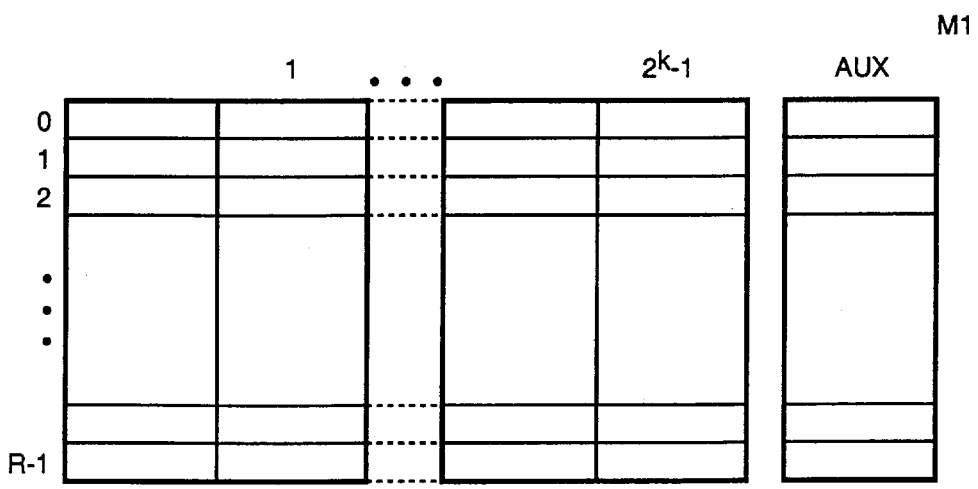
FIG. 2 is a diagram showing the organization of the memory according to the invention.

In FIG. 2 the logical structure of the memory according to the invention is represented, assuming for example that at each search step a maximum of k bits of the prefix is considered. As can be seen, the trie memory is made, in a conventional way, by a matrix with $L=2^k$ columns, each one corresponding to one of the possible combinations of the address bits, k at a time, and a number R of rows which depends on the number and the distribution of the addresses and on the value of k. Each memory cell may be empty (i.e. it corresponds to combination which is not present in any of the stored addresses) or may contain the address of a successive row to be reached and/or the indication relating to the fact that a target has been reached.

In case the search is based on the longest prefix match, the two indications "target reached" and "passage to the successive row" are not mutually exclusive and this must be accounted for when organizing the data. For this purpose it would be obviously possible to adopt a structure where the cells comprise a field for the address of the successive row and a field for the "target reached" indication. Yet this solution would represent a useless waste of, memory since the simultaneous presence of the two indications is an exception and not the rule, so that for almost the totality of the cells one of the fields would be empty. Also the solution described in literature, which considers restructuring or expanding the prefixes so as to eliminate the multiple matches and to shift the targets to the final level of the tree, is not convenient since such a solution requires much greater memory dimensions especially if the number of entries in the table is large, and makes the incremental updating a difficult job.

In order to satisfy the above mentioned requirements, each cell of the memory according to the invention is formed by an exclusive information field and by a pair of flags (GO and TARGET) whose combination defines the meaning of the content of the information field. The information field may comprise for instance 22 bits (in the present case concerning Internet addresses on 32 bits), so that each cell contains on the whole 3 bytes.

The first flag, GO, allows determining whether the search should continue or not, while the second flag, TARGET, indicates the existence or not of a valid target. If GO is 1, the 22 bit field contains the indication of the next row to be considered in searching an address, both in the phase of routing a packet and in the phase of inserting and deleting entries into/from the table (field NEXT-ROW). If GO is 0, the 22 bit field does not contain valid information if the flag TARGET is 0; on the contrary it may be interpreted as the indication of a valid target to be supplied at the output as a result of the search. In this case the 22 bit field is composed of the following sub-fields:

VALUE: 9 bits coding the actual identity of target;

MASK: 4 bits coding the mask associated to the target stored in sub-field VALUE. If k is the search step, the MASK value may vary from 0 to k−1. A value lower than k−1 indicates a prefix whose length is not a multiple of k.

T_BAK: 9 bits coding a so-called "proper target" (or "backup target"): this term denotes a target that can be "covered", i.e. a prefix that has a length non-multiple of the search step and that can be hidden (covered) by a set of longer prefixes. The information on the existence of this shorter target is to be stored to avoid that, after having deleted a prefix of the corresponding row of the memory, a search could provide a non-correct result, as will be explained later. The cell where the information T_BAK is stored is determined by a simple mathematical relation that will be explained later. In case no prefix that can be covered exists, a pre-established value NULL is assigned to T_BAK: e.g. supposing that the table could give access to a maximum of 512 (i.e. $2^9$) targets, the value NULL may be 511, i.e. $2^9-1$. It must be noticed that, in order to store the information T_BAK, the fact is exploited that the fields VALUE, MASK of target have an overall length lower than the length of the information field of the cell, and then a portion of the cell is exploited that otherwise would be left unused. Choosing the dimensions of the subfields VALUE, MASK so as to allow of such feature does not involve a loss of generality for the structure.

The case GO=1 and TARGET=1 corresponds to reaching a target and to the simultaneous need of continuing the search operations. Since, as said, a cell must not contemporarily contain the indication of a row to be examined and the longest target associated to the reached level, it is necessary to defer the second information. The target information is common to all the cells in the row indicated by the field NEXT-ROW, therefore it is possible to store it "ideally" on top of the row itself. To keep a number of columns which is a power of 2, according to the invention an auxiliary vector of R cells, indicated by AUX, is associated to the memory M1. Each cell in the vector is associated to a row of the memory M1 and has the same structure as the cells in M1. Such a vector contains, for each row, the target information inherited from a cell of the preceding level owing to the need of storing in such cell a value of the next row to be examined. From now on, the notation AUX[NEXT_ROW (current cell)] will be used to indicate that the target information found in correspondence of a cell is to be stored, in the auxiliary vector, in the row to be reached starting from the cell itself.

For all the other combinations of the flags GO and TARGET the cell AUX[NEXT_ROW(current cell)] is empty. In conclusion, the meaning of the two flags is:

| GO | TARGET | 22 bit field |
|----|--------|--------------|
| 1  | 0      | Next row to be examined |
| 1  | 1      | Next row to be examined; AUX [NEXT_ROW (current cell)] contains a valid target for the address |
| 0  | 1      | Most specific valid target for the address in the subfield VALUE (search terminated) |
| 0  | 0      | Empty cell (search terminated) |

Coming back to the information T_BAK, the position in the memory where this information should be stored is based on the consideration that, for a search step k, the number of prefixes that can be covered is $$\sum_{j=1}^{k-1} 2^j - 2.$$

Therefore it is possible to store in a memory row the prefixes that can be covered belonging to the same row, by exploiting the fact that the number of cells in the row is exactly $_2k$. The prefixes of a length multiple of k cannot be covered by other longer prefixes being themselves the longest prefixes storable in the row. In fact a function exists which establishes a one-to-one correspondence between each pair "address portion of k bits, mask of the portion less than k" and a cell in the row. If "index" is the address portion and MASK (less than k) the mask corresponding to the portion, the cell in which the target that can be covered is to be stored within the row has a position "offset" identified by the following relation:

$$\text{offset} = \text{index} - 1 + 2^{(k\,MASK-1)}$$

Use of the "offset" information will result from the description of the insertion and deletion operations.

Now the search, insertion and deletion operations in the memory according of the invention will be described referring also to thee enclosed flow charts. There, the following abbreviated terminology has been adapted:

dest_add, dest_route=destination address or destination output respectively;

prow=pointer at the row to be reached (current row); ptarget=pointer at a possible target (used for keeping trace until the search end of a target potentially to be covered, located during the searching itself);

t_info=target to be supplied at the output; cell.go, cell.target, cell.value, cell.row, cell.mask, cell.t_bak= values of the homonymous flags/fields for a cell (for simplicity of graphic representation and notation, in the diagrams a cell is treated as it would comprehend as many fields as are the information it is to supply:

maskbit=mask of the address portion being examined.

Figures 3A, 3B, 3C, 5:
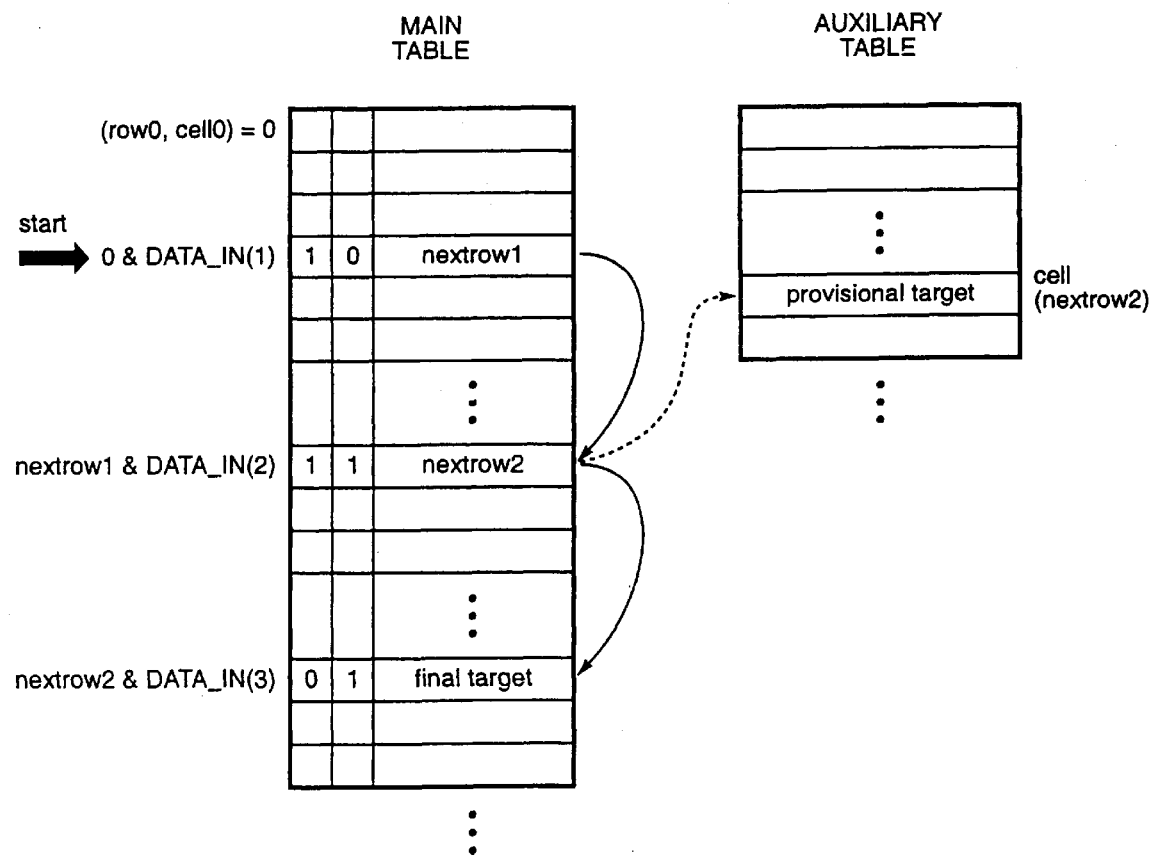
FIGS. 3A to 3C are representations of data organizations in a memory cell.
FIGS. 4 and 5 are diagrams concerning search operations within the memory of FIG. 2.
Figure 4:
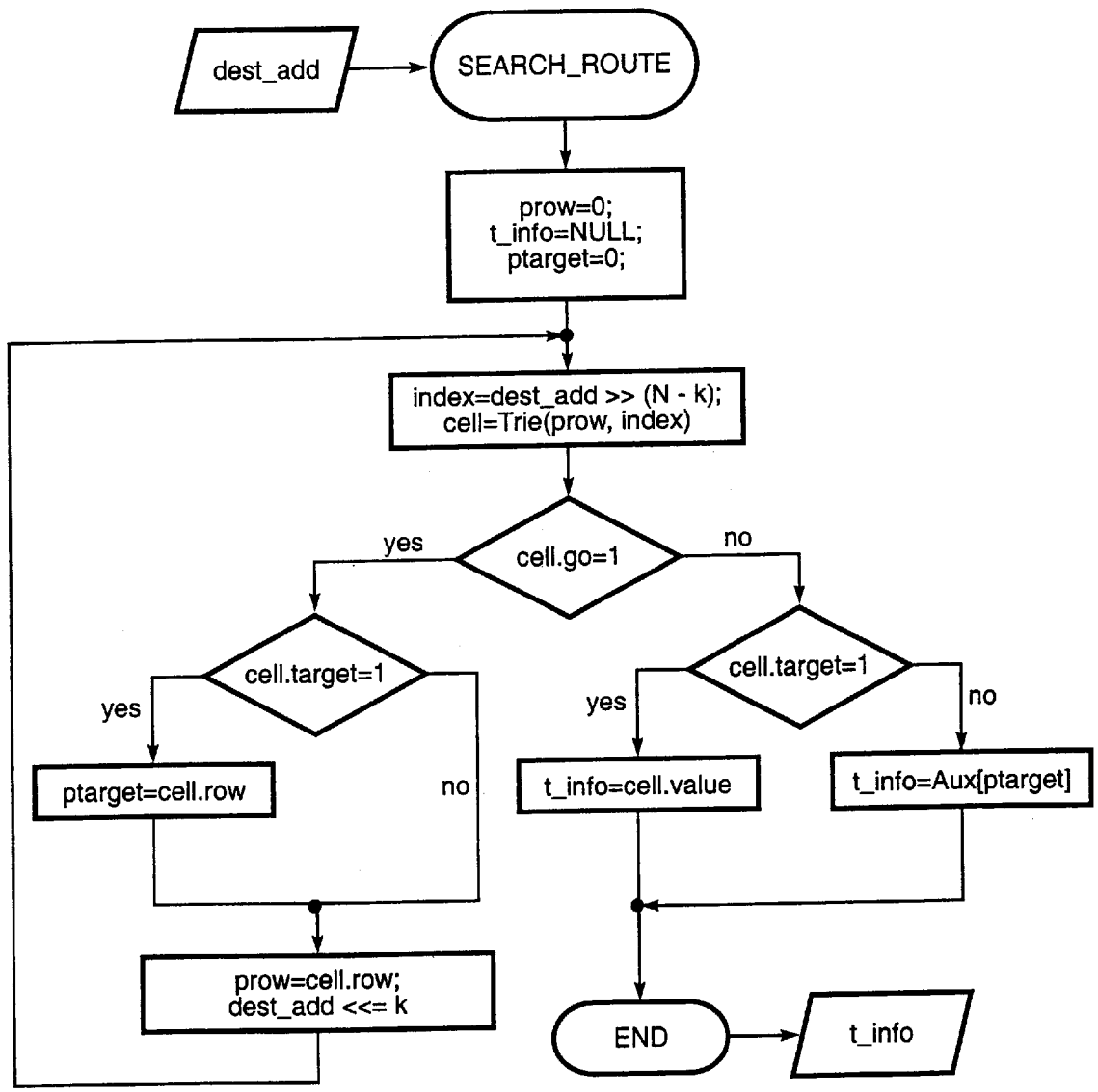
Figures 6, 8:
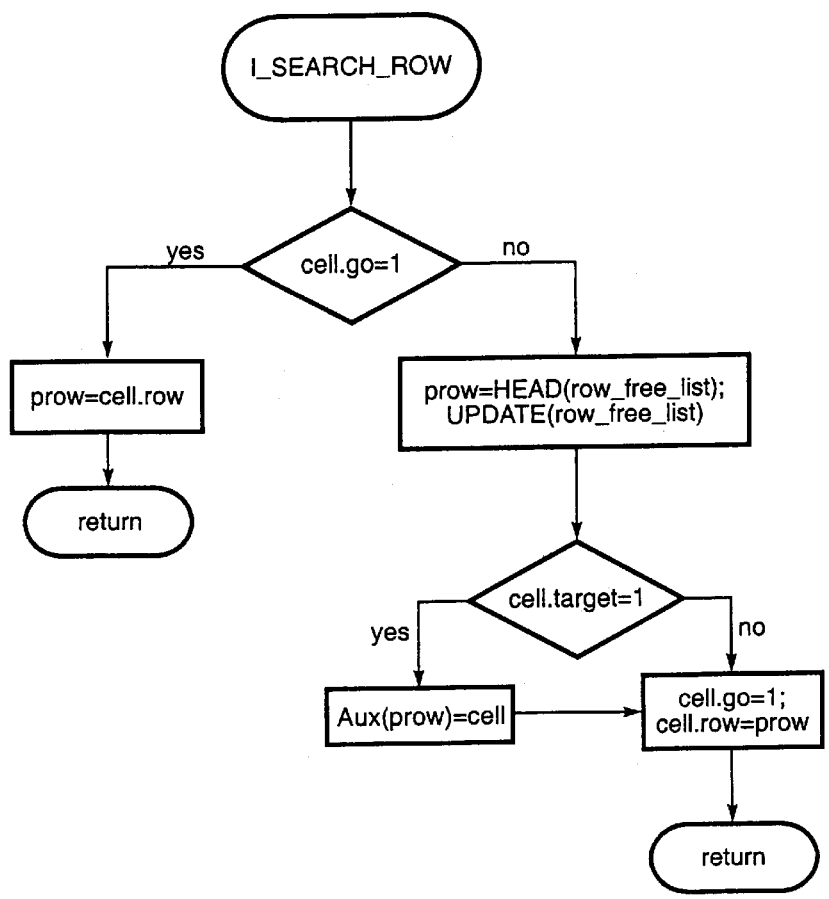
FIG. 6 is a numerical example of search.
FIGS. 7 to 15. are flow charts concerning data insertion and deletion in the memory according to the invention.
Figure 7:
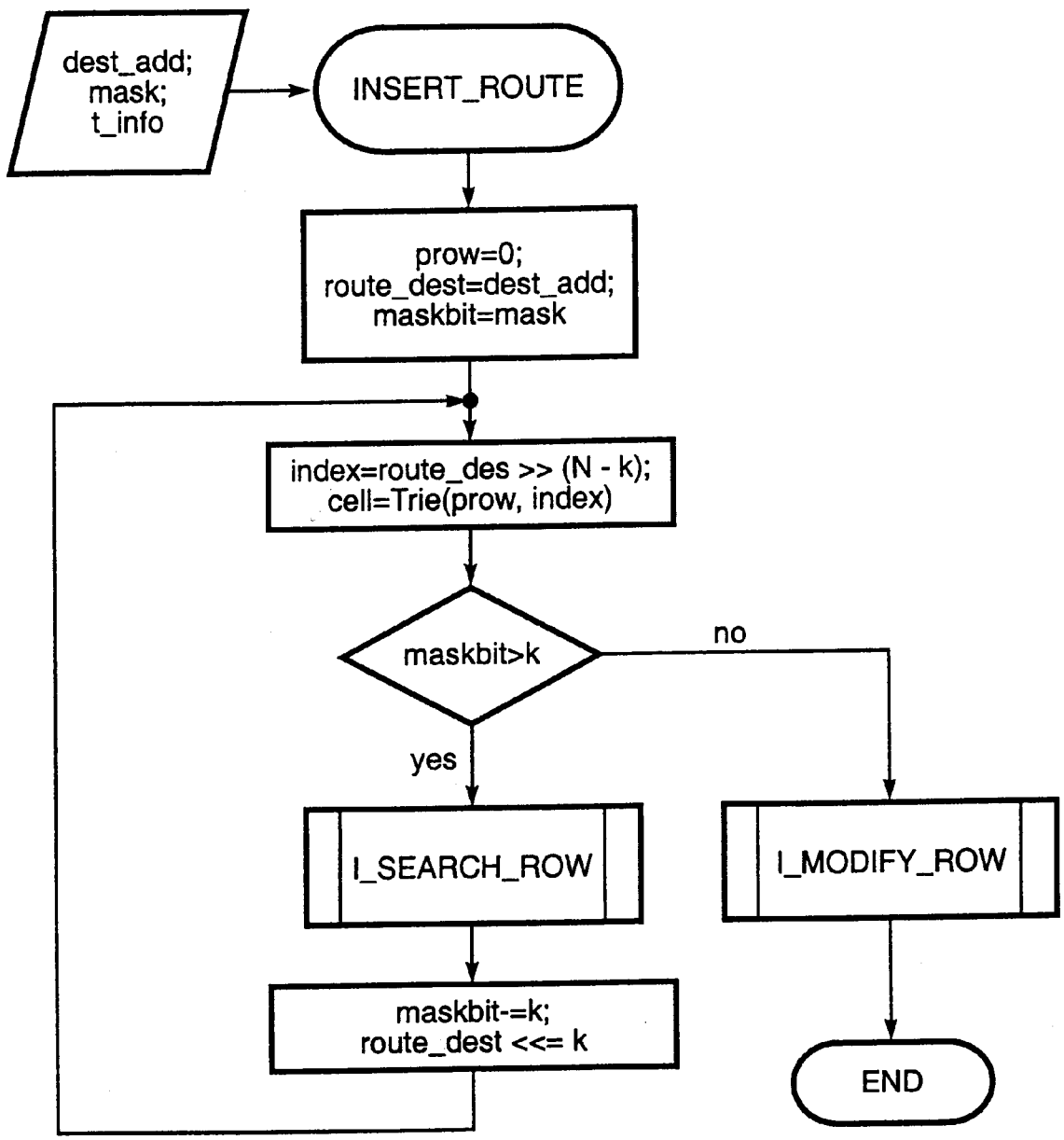
Figure 9:
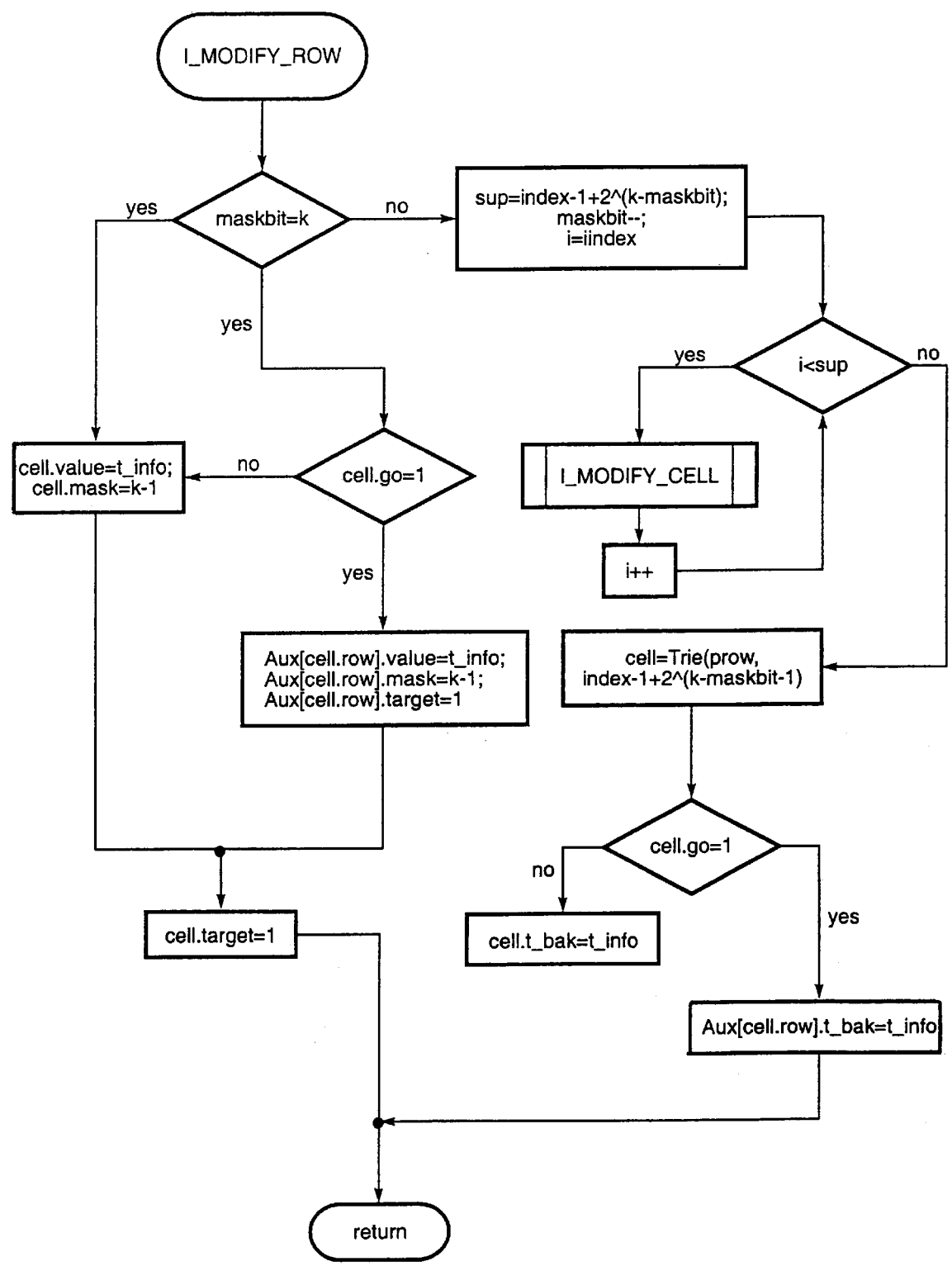
Figure 10:
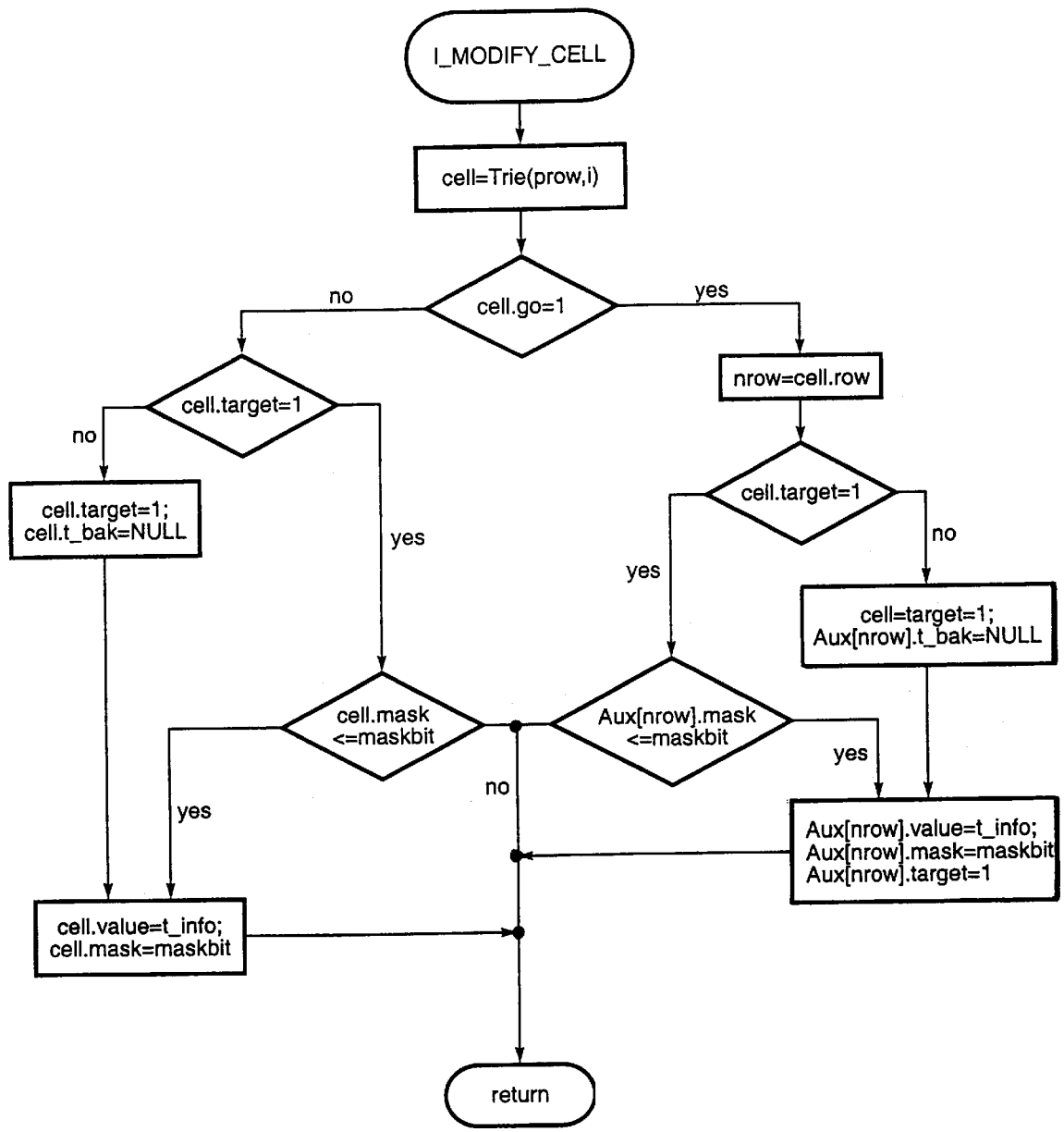

1) Search (FIGS. 4 to 6).

During the search phase, the memory receives as an input the destination address looked for. Row 0 of the memory is always the starting row and the search passes from a row to the next one whenever a group of k bits ("index") of the destination has been examined: the analysis starts from the most significant k bits and continues by groups of k bits until the number of mask bits still to be examined becomes less than or equal to the step k: the correct cell within the row is that corresponding to the value of the group being examined.

At each row, if the flag GO is 1, the next row to be examined is indicated in the field NEXT-ROW of the current cell. However, before accessing the next row, the flag TARGET must be checked. If it is 1, this means that the next row has inherited the target from the current cell during the inserting phase, as will be better seen later on. Such a target is the most specific one found till now and consequently it must be stored. The use of pointer "ptarget" provides for such storage operation without needing an actual access to the memory for writing an information that could become obsolete during the searching phase.

If the flag GO is 0, the search is over. Anyhow, to determine the information to be supplied at the output, the flag TARGET is to be checked. If this is 1, the current cell contains the most specific target for the address at the input, otherwise the target has been already determined during the search phase and is stored in the cell of AUX indicated by "ptarget". It should be noticed, however, that in this second case the target value in the cell AUX could be NULL, i.e. the search has been unsuccessful since a valid prefix for the destination looked for does not exist in the memory.

The search process has been expressed in vector form in FIG. 5 and is also illustrated by numerical examples in FIG. 6, where for simplicity an 8-bit destination address and a step k=2 has been considered. In this Figure G and T show the flags GO and TARGET.

It is assumed that the following addresses, with relevant masks and targets have been stored:

| address  | mask | target |
|----------|------|--------|
| 00100000 | 4    | A      |
| 00100111 | 8    | B      |
| 01101000 | 5    | C      |
| 10000000 | 1    | D      | and that a routing for two messages whose addresses are respectively 01101100 and 00100101 is to be looked for.

For the first message the searching path is: row 0, cell 01→next row=4 (GO=1, TARGET=O) row 4, cell 10 4 next row=5 (GO=1, TARGET=O) row 5, cell 11: in this cell GO-.O and TARGET=1; the search must end even though the pair of bits 00 is still to be examined: this means that in any case more specific prefixes do not exist in the memory;

a target (C, relating to the third stored prefix) has been found and it is outputted; in addition, since the mask of the prefix with which the match has been reached is 5, the prefix (01101) covers both cell 10 and cell 11 and, in the first one the value of the target is stored also in the field T_BAK. It is immediate to see that cell 10 meets the relation indicated above, for the storage of the target in T_BAK.

For the second message the search path is row 0, cell 00→next row=1 row 1, cell 10→at this point the search is not concluded (GO=1), but there is also TARGET=1, since there is a match with the prefix of the first stored address, with target A (the second stored address, even if it has the same initial bit of the first one, has mask 8 and then the match with it may be recognized only after the examination of all the 8 bits); therefore the vector AUX must be used and values of MASK and VALUE of the target found are stored in the row of this vector indicated by the field NEXT-ROW. of the cell 1.0. of row 1 (row 2);

row 2, cell 014→next row=3 row 3, cell 014→the cell does not contain any data and then the target to be used is that of AUX.

2) Insertion (FIGS. 7 to 10)

In case of insertion, the entry to be loaded into the memory comprises an address, the mask and the target (output associated to the address). The operations proceed as for the search, starting from the initial row (row 0) of the memory and advancing each time by a row (subroutine I SEARCH_ROW) until the number of bits not yet examined in the mask becomes less than or equal to step' k. The row where this condition is reached represents the row in which the new entry must be stored (subroutine I_MODIFY_ROW).

Considering first the row search (subroutine I SEARCH_ROW, FIG. 8), the operations to be performed in a row depend on the value of the flag GO. If GO=1, the row already exists and the next row indicated in the field NEXT-ROW must be accessed without performing any particular operation. If GO=0 the row must be created. The row to be created is for instance the first of a list of empty rows (HEAD(row free_list)) which is consequently updated (UPDATE (row-free-list)). The way in which an empty row list associated to a memory can be organized is well known to the technicians and does not make part of the present invention, so that no description is needed. Moreover, if TARGET=1, the target contained in the cell is copied into the auxiliary vector AUX, at the address corresponding to the new row. In any case, flag GO is set to 1 to indicate that now the current cell contains the indication of the next row to be examined.

Passing now to the operations to be accomplished in the destination row (subroutine I_MODIFY_ROW, FIG. 9), they depend on whether the number of bits to be examined is actually k or is less than k. In the first case, in fact, the cell interested by the insertion is unique, whilst in the second case the operation concerns a group of cells.

If the number of bits to be examined is k, the target cannot be covered and will surely be stored into a cell. The cell to be used depends on the value of flag GO and it will be the cell of the current row of the memory if GO=0 or the cell of the auxiliary vector addressed by the contents of the current cell if GO=1. In both cases, the target and the mask are stored in the cell and if GO=0, the flag TARGET of the cell of the vector AUX is set to 1. Thereafter, the flag TARGET of the cell of the current row is set to 1.

If the number of bits to be examined is less than k, the input address target concerns all the group of adjacent cells in the current row from the "index" column to the column indicated by the "offset" value ("sup" in the diagram)—i.e. all the interval of cells that may be reached in the k preceding steps along the tree. For each of these cells the operations of subroutine I_MODIFY CELL (FIG. 10) are accomplished. Also these operations are guided by GO and TARGET values:

if GO is 1, the cell contains-already a row pointer and the target must be stored in AUX if the flag TARGET is 0, or if TARGET is 1 but the mask stored in the cell AUX is less than or equal to the input mask;

if GO is 0, the cell does not contain any row pointer; if TARGET is 1, the input target is stored into the trie memory cell if the mask stored therein is less than or equal to the input mask, if the cell is empty (GO=0 and TARGET=0) the target is stored while contemporarily setting the flag TARGET to 1 and the field T_BAK to NULL value.

Once the last cell is reached (FIG. 9, output "no" from i<sup) the relevant flag GO is still checked and the target is stored in the field T_BAK of the cell of the current row or of the auxiliary vector according to whether GO is 0 or 1.

It must be noticed that the row modification operation has been described in the hypothesis that the memory is initialized to 0; otherwise, checks on the value of T_BAK 10 may be needed.

3) Deletion of an Entry (FIGS. 11 to 15)

For the deletion of an entry, the memory must be scanned until the row containing the requested entry is reached. The final row is indicated, as for the search or the insertion, by the fact that maskbit is less than or equal to k. The deletion consists in deleting from the cell or from a set of cells the values MASK, VALUE of the target and substituting them, if necessary, with the values of a less specific target covered by the one that is to be cancelled.

To correctly perform these operations, keeping trace of the rows examined is needed, and for this purpose we use a vector "STEP", which has as many cells as the memory rows are and stores the address of a row examined (prow), and a counter "ACTUAL" counting the rows examined.

Figure 11:
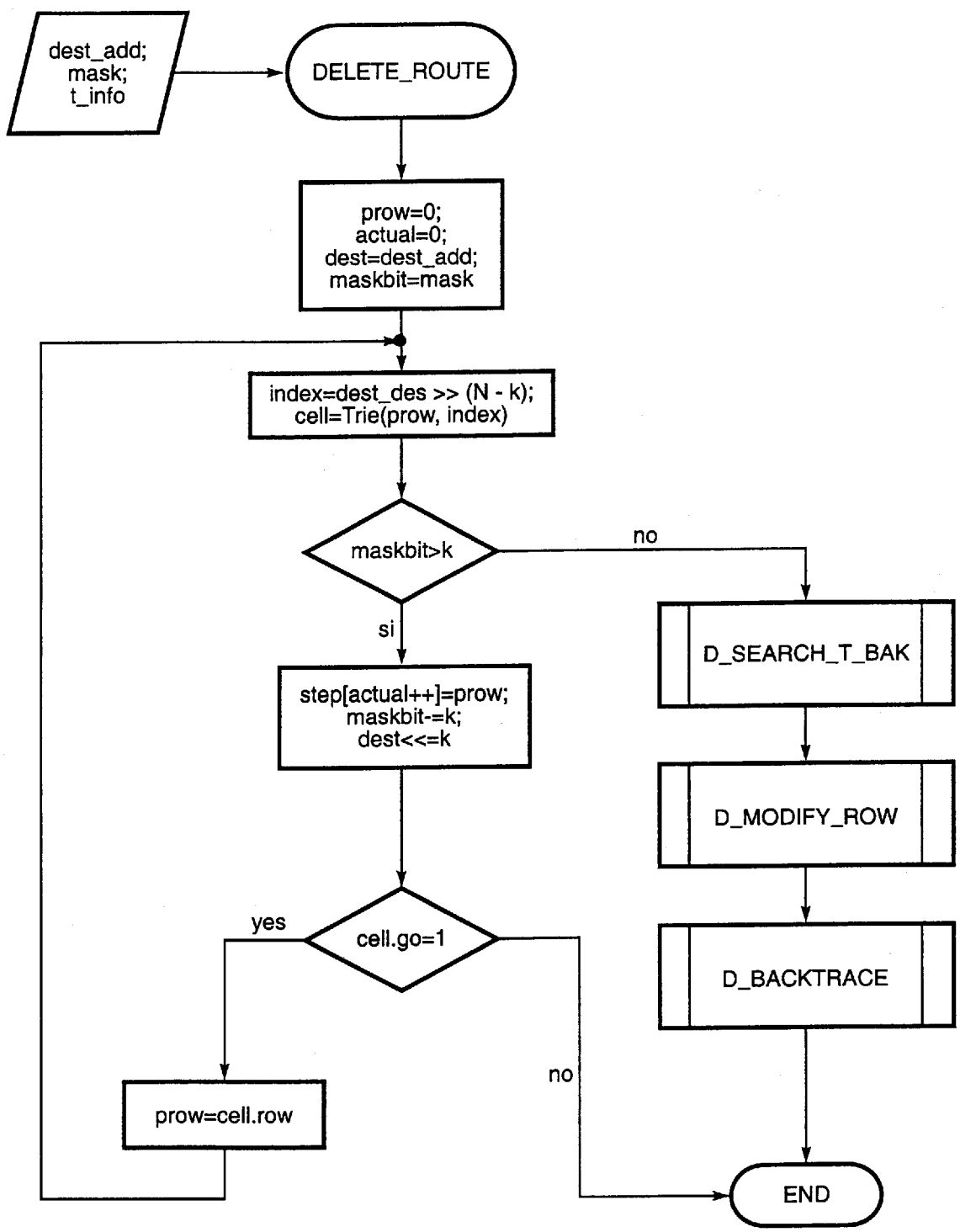
Figure 12:
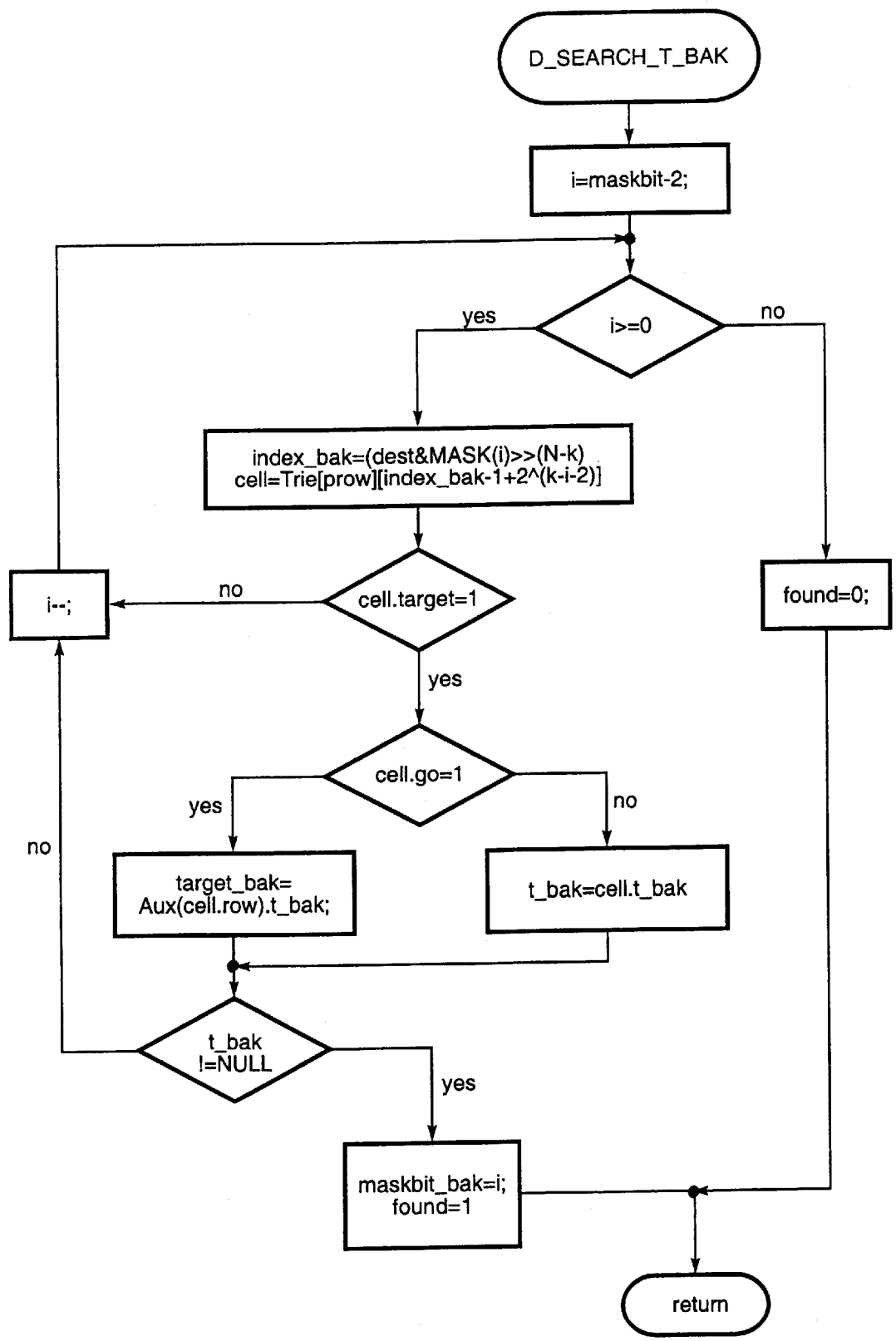
Figure 13:
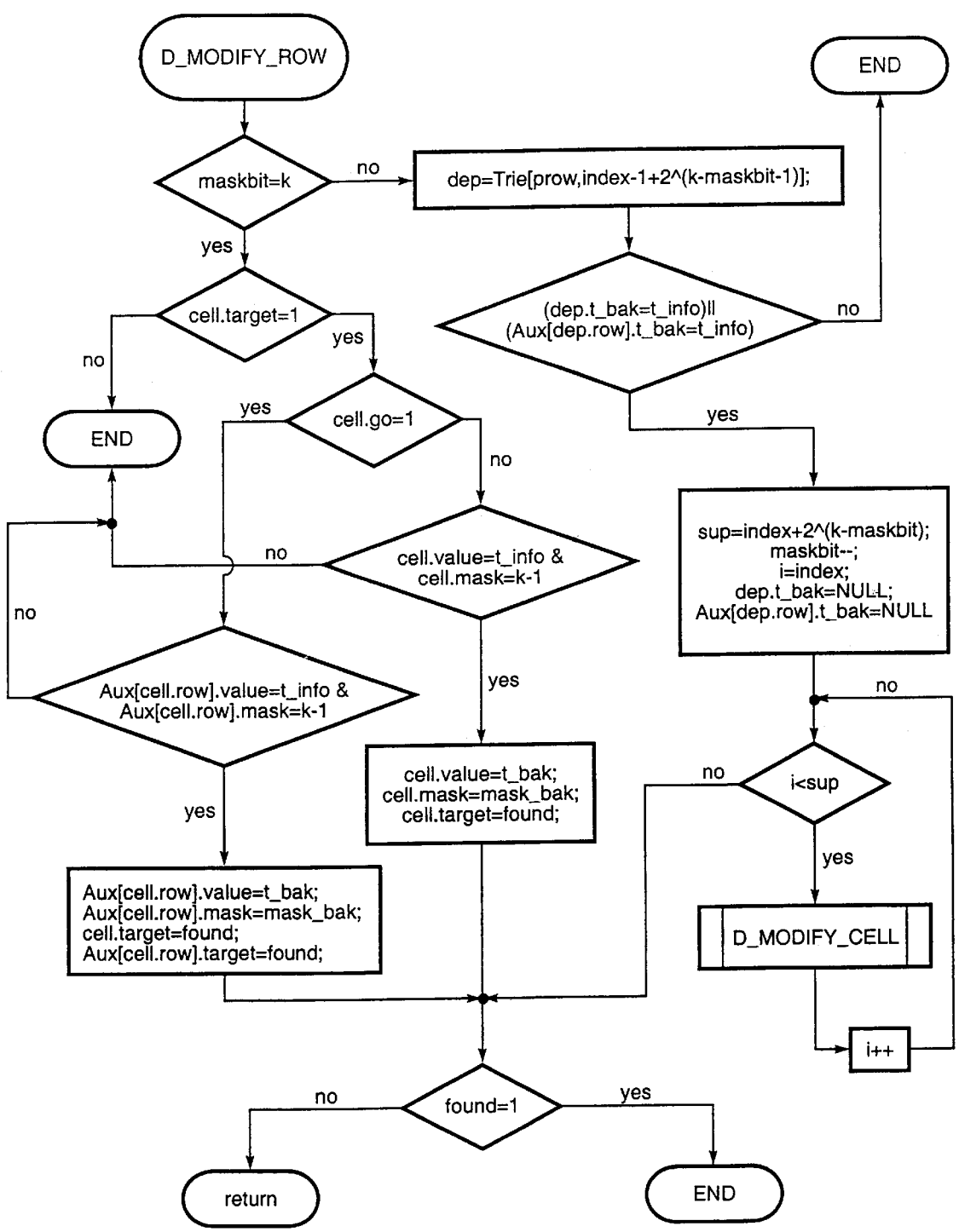
Figure 14:
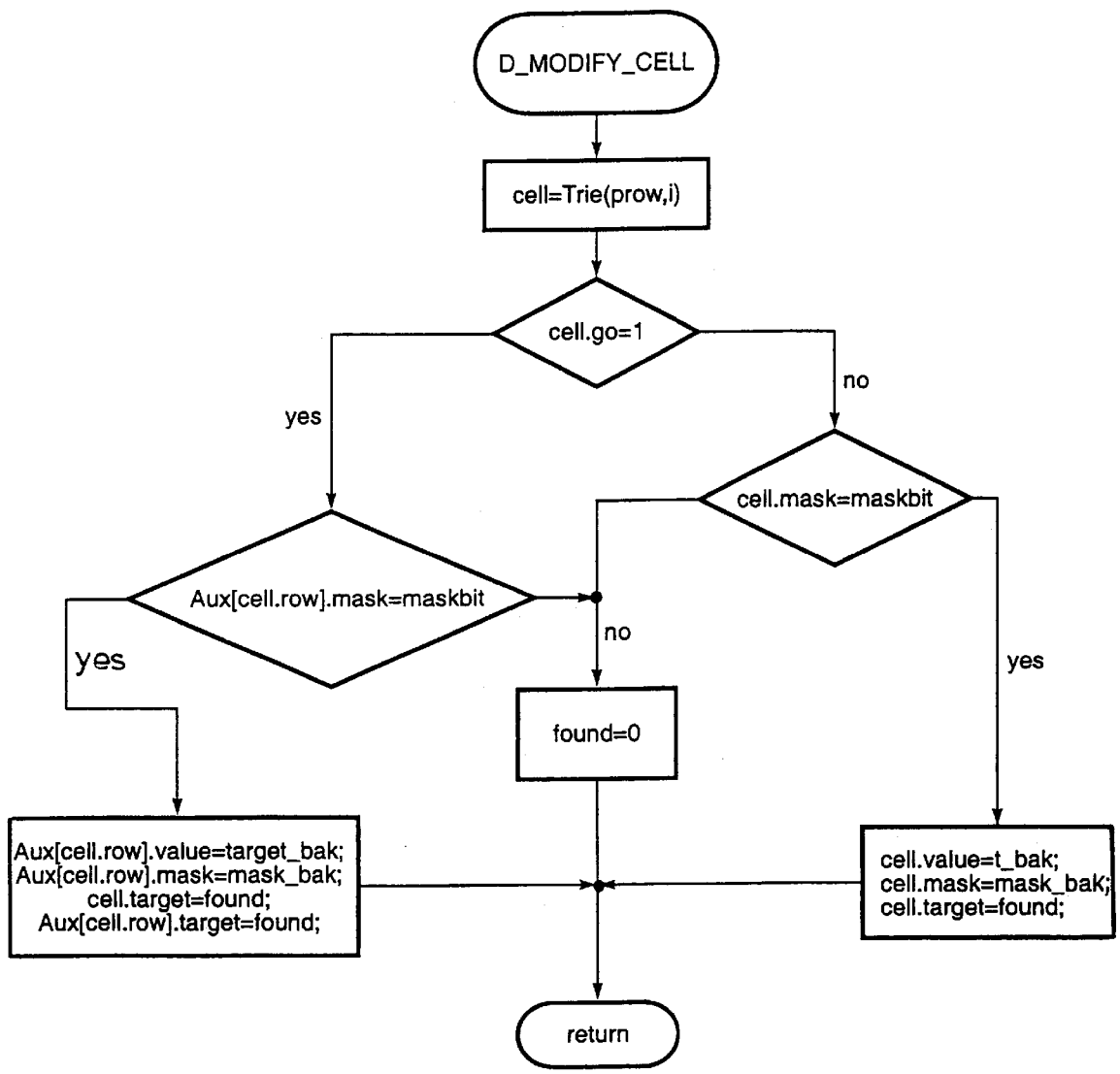
Figure 15:
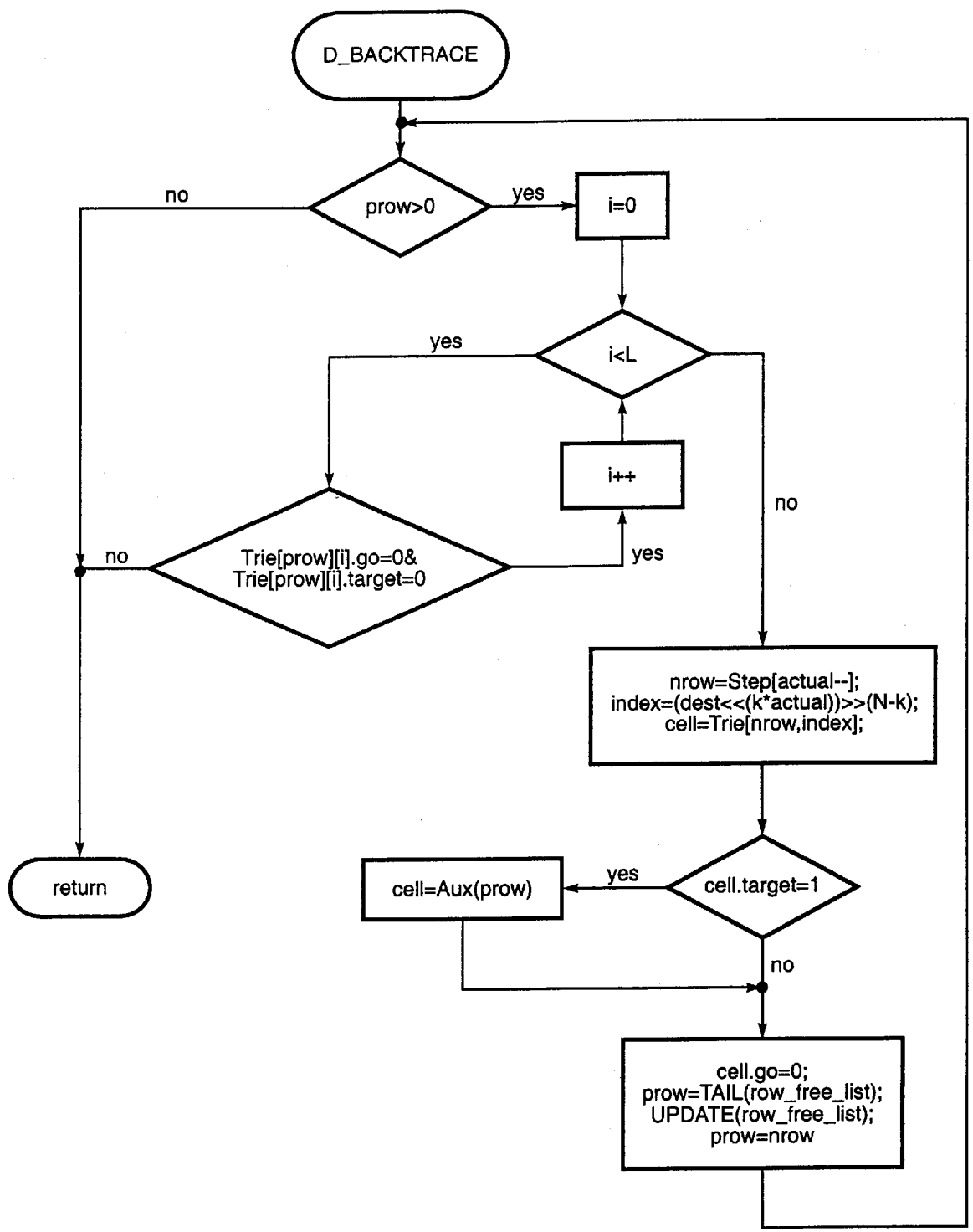

The general deletion process is represented in FIG. 11.

Whenever a new row is examined, the relevant address is stored in the proper position of the vector "STEP". For every cell reached the flag GO is also checked; if this is 0, this means that the deletion operation concerns a destination address that in reality is not-stored and this obviously causes the end of operations. Once the destination row is reached, the existence of a substitutive target is looked for in the same row (subroutine D SEARCH T_BAK), the row where the prefix is inserted is modified by using the substitutive target found, if any, (subroutine D_MODIFY_ROW), and a backward check is effected on the rows become empty (subroutine D_BACKTRACE) to eliminate them.

In the subroutine D_SEARCH T BAK (FIG. 12), there are examined the cells identifying a prefix of an entry to be deleted, which prefix, owing to the memory construction, could be stored in the row of interest: i.e. the cells that could have in T_BAK a possible shorter prefix are examined. This search requires the examination of the cells corresponding to the portion of the search tree that has led from the preceding row to the current one. The search goes on until a valid target is found (in the cell of the memory or in that of the auxiliary vector, according to the value of GO) or until all the cells have been examined without finding the target. If the field T_BAK of the cell of interest has not the NULL value, a substitutive target has been found, which is associated to the respective mask. The retrieve of the target is signalled by setting to 1 a flag "found".

For the row modification (subroutine D_MODIFY_ROW, FIG. 13), as in the case of the insertion, it must be checked whether the bit group has exactly k bits or less than k bits, in order to establish if the mask identifies only one cell or a group of cells.

In the first case, it is necessary to distinguish whether the entry is to be searched for in the vector AUX or in the actual memory cell, according to value GO. If a substitutive target was found with the preceding subroutine (flag "found" at 1), this will substitute the target to be deleted and the operation is over. If no substitutive target was found, once the delete operation is effected, it will be necessary to further verify that the row is not become empty.

In the case of maskbit<k, the possible entry to be deleted is stored in the T_BAK field of the cell with address "offset" in the memory or in the corresponding cell of vector AUX. All the cells corresponding to the "sup" interval (subroutine D_MODIFY CELL) are checked. If a substitutive target is found, the VALUE and MASK fields of the cell are to be modified; if no target is found both flags GO and TARGET are set to 0 to indicate that the cell is empty and in addition the T BAK field is set to NULL.

It must be noticed that during the execution of the subroutine D_MODIFY_ROW, there is also checked that the request does not concern a non existing element (which is indicated, for maskbit=k, by TARGET=0 or by MASK≈or VALUE≈t-info, and for maskbit<k, by the absence of the target value in T_BAK field): in these cases obviously the search immediately comes to an end.

Lastly, to eliminate the empty rows (subroutine D_BACKTRACE, FIG. 15), all the rows examined in the search are back traced and for each of them flags GO and TARGET of all the cells are checked. When the flags of all the cells in a row are 0, the row is empty and it is necessary then to go back to the cell "father" from which the passage to the empty row occurred. For this purpose the counter ACTUAL and the vector STEP are used. If for this cell "father" the TARGET flag is 1, the data of the corresponding cell of AUX must be transferred into such cell. Once this is effected, the identity of the emptied row is queued to the empty row list (prow=TAIL(row free_list), UPDATE row-free-list) and the next row, i.e. the row containing the cell "father", is examined. Once a row where at least a cell is not empty is reached, the operations come to an end.

It is deemed useful to discuss the hardware implementation of the memory just described. The architecture is essentially constituted by a state machine (part of the controller CT in FIG. 1) which controls the access sequence to the data structure stored in an external memory (Ml in FIG. 1), which is advantageously a dynamic RAM memory. The overall architecture operates as a ternary CAM memory. The memory initialization and updating may be controlled either by another state-machine or by a conventional microprocessor, also embodied in the controller CT for simplicity. The architecture is extremely flexible, since a string of arbitrary length can be received, while the output is an index (or compressed identifier) whose meaning is left free and dependent on the application context. In the case considered of the Internet network, the output is usually a pointer to the table M2 containing next hop data (level 2 addresses) needed for forwarding the packets to the destination address supplied as an input identifier. The external data structure is composed by a programmable number of rows each containing $2^L$ identical adjacent cells, together with the auxiliary cell containing the target information common to all cells of the row. To obtain the cell addresses by putting side by side a row address plus a cell address, the auxiliary target cells of the row are separately stored—in the same data structure—for instance after the last row containing the actual data. The memory dimensions depend on the prefix distribution and the search step. As an indicative title, an existing forwarding table with about 40,000 entries requires about 14,000 rows (corresponding to about 0.7 Mbytes of memory) if k=4 and about 3,000 rows (for a total amount of about 2.4 Mbytes of memory) if k=8. The dimensions are therefore perfectly controllable.

From what described above the advantages offered by the invention are clear:

the adoption of the two flags for characterizing the contents of the cell and the use of an auxiliary vector for the exceptional cases where a target found before the end of the searching phase is to be stored, make the memory very compact and avoid the waste intrinsic in a possible duplication of the information fields;

taking into account that the auxiliary vector, in the hardware construction, will simply constitute an additional string of cells for the actual trie memory, the same device can be used also for fixed length masks, when the problem of the longest prefix match does not occur. The only difference is that in this case the auxiliary vector will never be addressed; in this case the structure works as a normal binary CAM, wasting a single bit per cell;

thanks to the field T_BAK, the existence of possible targets with shorter prefix is directly handled in the insertion and deletion operations and these only require the examination of a limited and predetermined number of cells (k−2, if k is the search step), thanks to the use of an explicit end of search flag, the structure is not tied to a particular length of the addresses or the masks and then will be usable, for what concerns the preferred application, also when 128 bit addresses will be adopted;

lastly, the insertion and deletion mechanism is particularly simple and is localized, i.e. it does not require the complete writing of the memory or parts thereof.

It is evident that what has been described is only given by way of non limiting example and that variations and modifications are possible without going out from the scope of the invention. In particular, even if reference has been made to the Internet network, the invention is applicable to any commnunication protocol where routing of the packets is based on fixed or variable length prefix match, for example, identification of ATM connections or MAC addresses (MAC=Medium Access Control, which is a layer in standardized communication protocols). In general the invention is applicable not only to the nodes of communication systems, but also to all the cases in which an information search or retrieval is to be performed starting from a prefix (for instance, information retrieval from data bases not belonging to communication networks), even though, in these applications, in general the speed requirements needed by the communication networks do not exist.

What is claimed is:

1. A memory for the implementation of an information search based on the analysis of prefixes constituting the most significant part of individual information items, said memory comprising:

a first memory element which stores a set of first information items each associated with a mask information, indicating a number of significant characters in a respective prefix and with a target information, which constitutes a data usable for access to a set of further information, said first information items being stored in respective memory cells organized in rows and columns, and control devices controlling the search for specific one of said information item in the memory and updating the memory, said control devices operating through a comparison between successive portions, of predetermined lengths, of an input string of characters and corresponding portions of the stored prefixes, that have a variable length which is not a multiple of the length of said portions, said memory having, for implementing a search criterion based on a longest prefix match providing as a result the longest prefix matching with the input string:

each cell comprising an information field that provides either a next row address for the search continuation or an information relating to a target reached, and a pair of flags which specify the contents of the information field, and an auxiliary vector provided with as many cells as there are memory rows and which, when the flags of said cells in the memory element indicate that a target has been reached together with the need of continuing search in a next row, is arranged to store the target information into the cell associated to said next row, each cell of said auxiliary vector comprising an information field and a pair of flags identical to those of the cells of said memory element.

2. A memory according to claim 1 wherein the information field in said cells of the memory element and of the auxiliary vector is arranged to store, for the information of target reached, a target identify and a value representative of the mask associated to that target.

3. A memory according to claim 2 wherein when the information of target reached is common to a plurality of cells, the information field in a cell of the plurality, is also arranged to store an auxiliary information relating to a shorter prefix that can be covered by the prefix to which the target reached is associated.

4. A memory according to claim 3 wherein said cell of the plurality is positioned, within the respective row, at an address that is in one-to-one correspondence with an examined input string portion, with a mask associated to that portion and with the respective portion length.

5. A memory according to claim 1 wherein the memory implements a routing table for a node of a high speed communication network and said prefixes are destination addresses or portions of destination addresses associated to information transmitted in said network.

6. A memory according to claim 5 wherein said network is the Internet network.

7. A method of managing a memory for information search based on the analysis of prefixes constituting a most significant portion of individual information items, said information being stored in cells of a memory element together with a mask information indicative of a number of significant characters in a respective prefix and a target information, used as a pointer to a further set of information, wherein said method comprises comparison between successive portions of a received string of characters and corresponding portions of the stored prefixes, that have a variable length which is not a multiple of the length of said portions, and wherein for the implementation of a search criterion based on a longest prefix match:

each cell of the memory element is associated with a pair of flags which specify, by their logical values, if a search operation ends at a row to which the cell belongs or must continue in a next row and, in this second case, if a match with a possible prefix has been found in the row of interest and then a target has been reached, every row of the memory element is associated with a cell of an auxiliary vector destined to store information on a target reached in correspondence of a row that is not the row at which the search ends, and a cell selected within a set of cells corresponding to prefixes of a length multiple of the length of said portions also stores the target information relating to a shorter prefix, not multiple of the length of said portions, which can be covered by said prefixes of multiple length, said cell being a cell of the memory element or of the auxiliary vector according to whether it is the final cell of a search or an intermediate cell during the search.

8. A method according to claim 7 wherein for deleting an information item, when reaching the row containing such information item:

a) a possible substitutive target, represented by a target associated to a shorter prefix, is reached, within said set of cells in the memory or in the auxiliary vector;

b) if such substitutive target exists, it is stored in a location of the prefix to be deleted.

9. A method according to claim 8 wherein an identity of all the rows examined during the search of an information item to be deleted is temporarily stored, and, in case of a target deletion without substitution, a backward check in the rows become empty as a result of an information deletion is effected and the relating identity is stored in a list of empty rows associated to the memory.

* * * * *